May 10, 1932.  J. F. NAYLOR  1,858,167

SPEED CONTROL GEAR FOR MACHINERY

Filed May 14, 1930  4 Sheets-Sheet 1

INVENTOR
Joseph F. Naylor,
BY
ATTORNEYS.

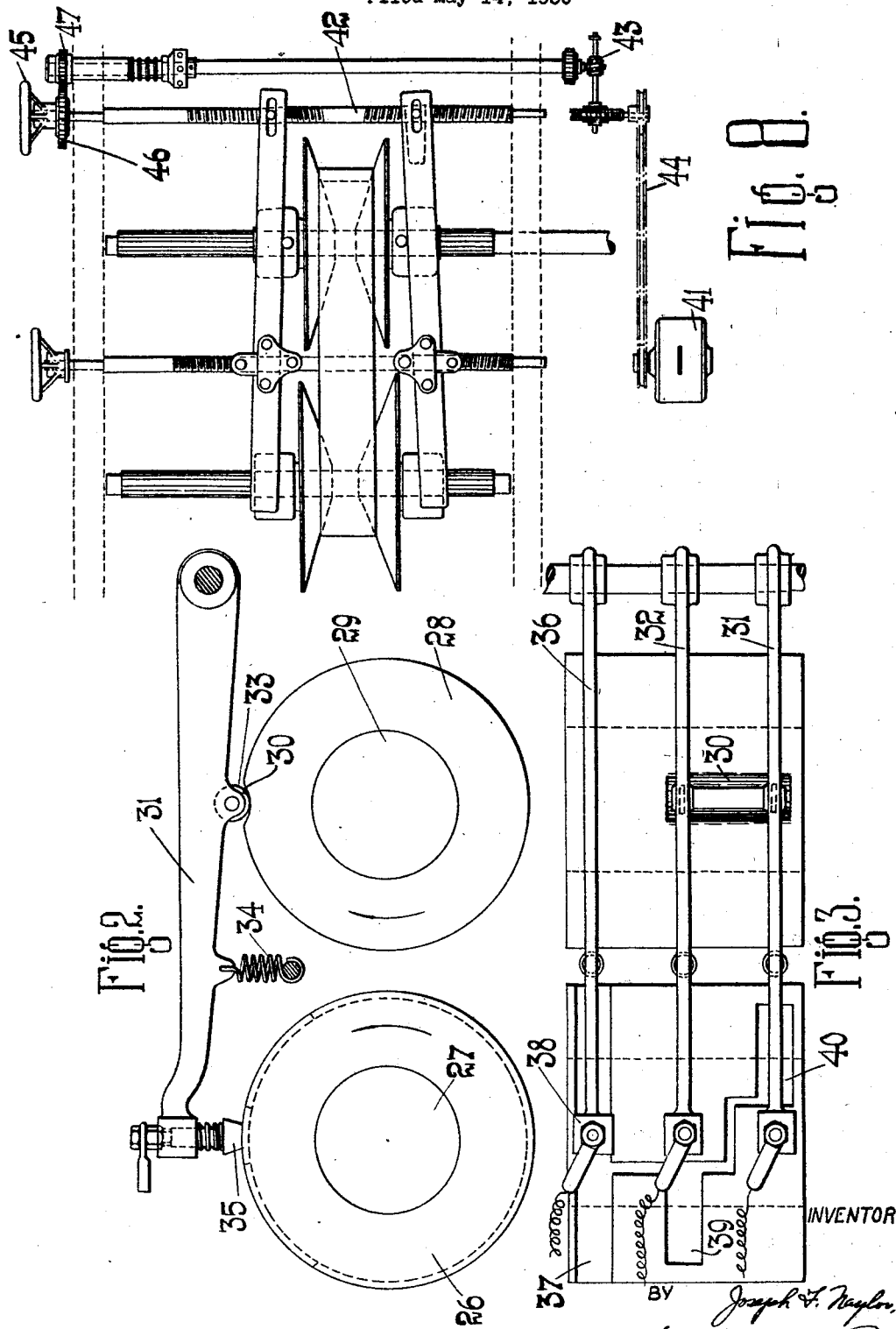

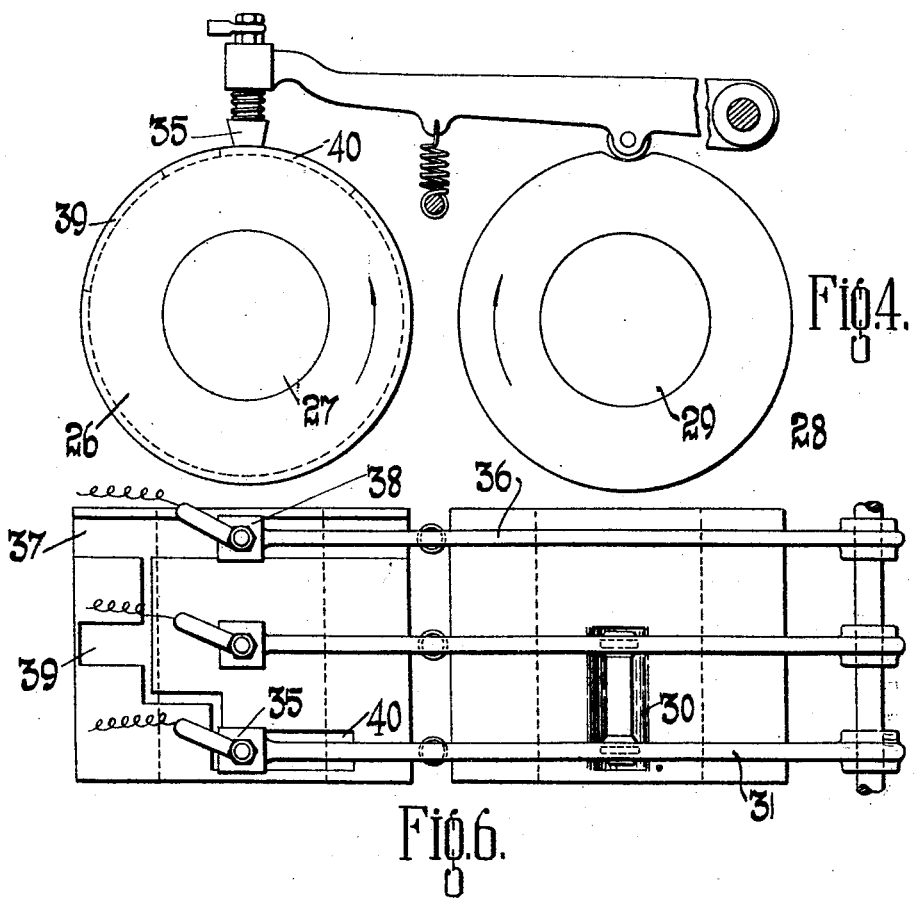

May 10, 1932. J. F. NAYLOR 1,858,167
SPEED CONTROL GEAR FOR MACHINERY
Filed May 14, 1930 4 Sheets-Sheet 4
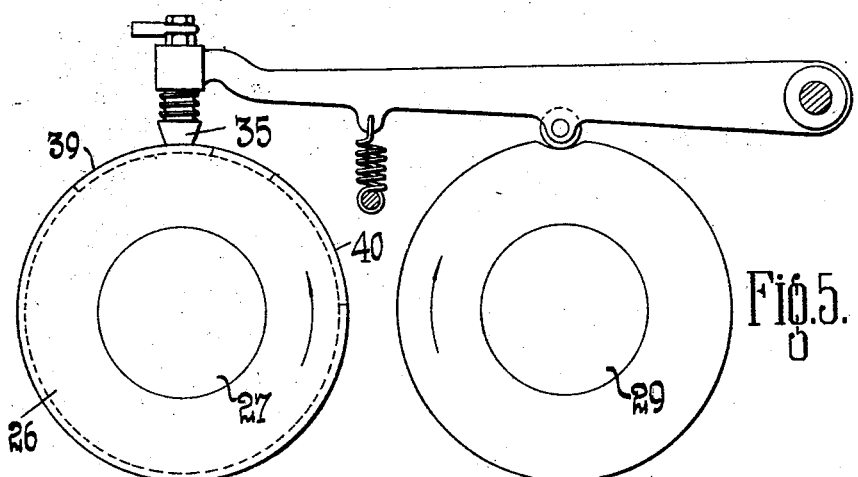
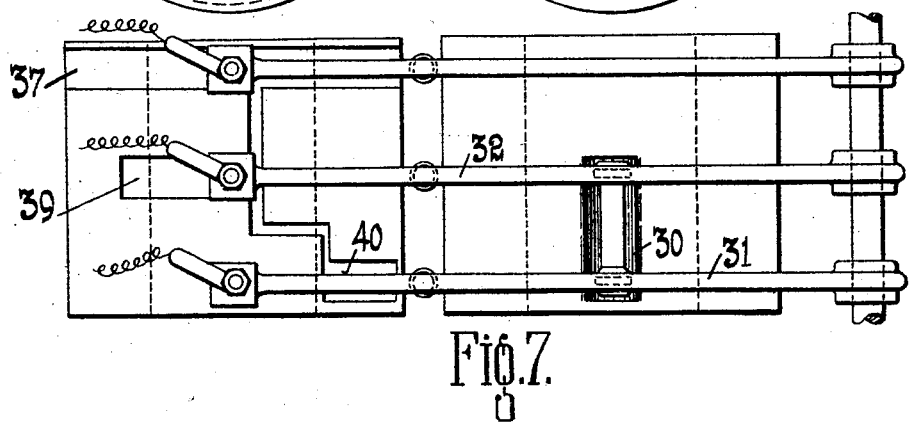
INVENTOR
Joseph F. Naylor
BY
ATTORNEY Patented May 10, 1932

1,858,167

UNITED STATES PATENT OFFICE

JOSEPH FRANCIS NAYLOR, OF EARLESTOWN, ENGLAND, ASSIGNOR OF ONE-HALF TO T. & T. VICARS LIMITED, OF EARLESTOWN, ENGLAND, A BRITISH COMPANY

SPEED CONTROL GEAR FOR MACHINERY

Application filed May 14, 1930, Serial No. 452,371, and in Great Britain June 12, 1929.

The present invention relates to speed control gear for machinery and particularly for machinery in which a number of individual units are required to run in synchronism.

A known method for running such a group of machinery synchronously is to drive the whole from one source of power, such as a common shaft from which each individual unit takes its drive, of through chains and wheels or other gearing which will positively maintain the same speed. Such a common shaft may be driven by a variable speed gear and any alterations in the speed of the shaft will alter all of the individual units.

A common drive to all the units as described, has disadvantages inasmuch as owing to the the disposition of the machines it is necessarily cumbersome and inconvenient to apply. Also in such a drive it is not possible to disconnect any one machine from the common shaft and drive it as a separate unit if such separate driving is at any time necessary.

According to the present invention each individual machine of a group is driven by a separate source of power and means are provided for maintaining constant the ratios of the speeds of the various machines of the group or the ratios of the speed of one machine and the speeds of the others.

The invention is more particularly described with reference to the accompanying drawings in which:—

Figure 2 is a side elevation of a controller.

Figure 3 is a corresponding plan view.

Figures 4 and 5 are further views of other forms of controller.

Figures 6 and 7 are corresponding plan views of Figures 4 and 5.

Figure 8 shows one form of variable speed gear for hand regulation.

Figure 1:
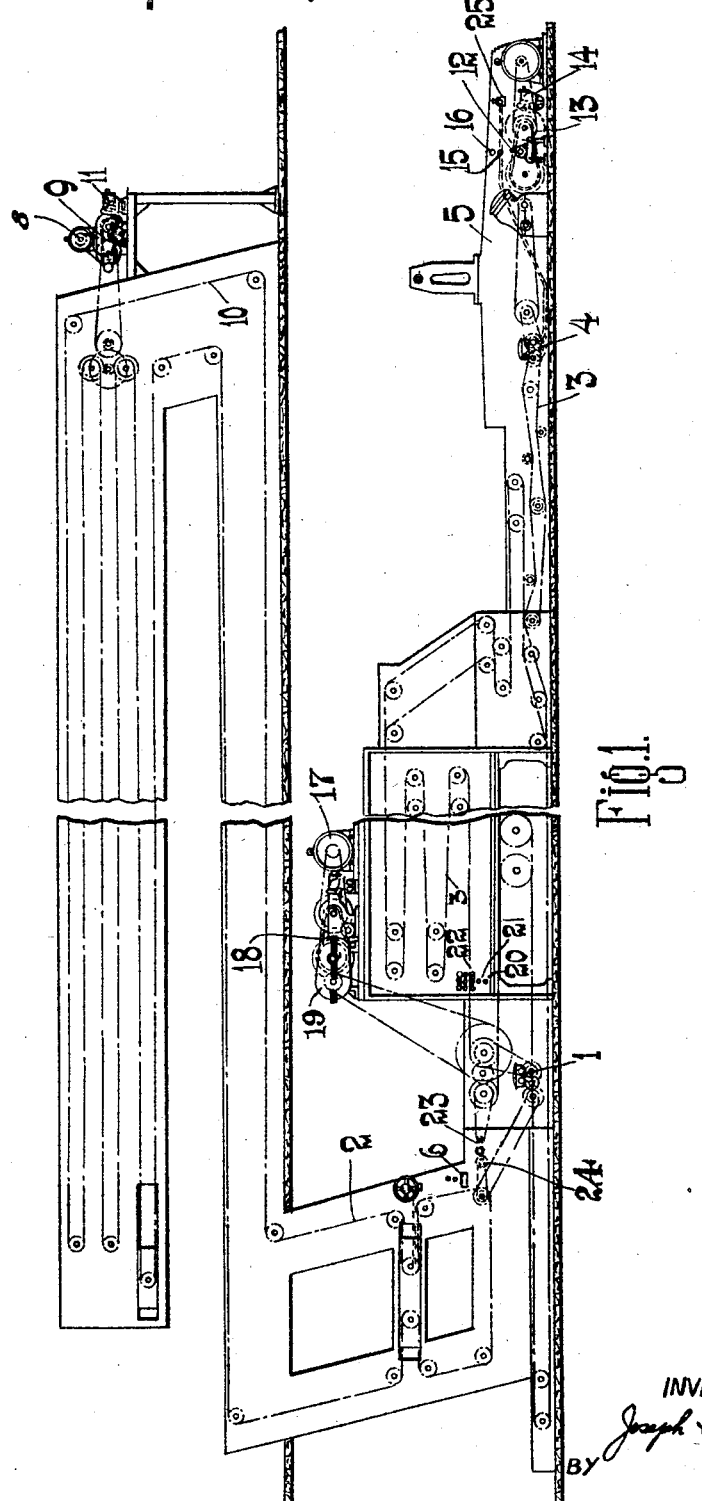
Figure 1 is a side elevation of a biscuit making and baking machine having the improvements according to the present invention.

In Figure 1 the synchronizing device 1 controls the speed of the elevator 2 relative to the speed of the oven conveyor 3. The synchronizing device 4 controls the speed of the cutting machine 5 relative to the speed of the oven conveyor 3. The remote control 6 for the motor 7 driving the conveyor includes the box shown containing the switch gear and the two buttons controlling the speed of the conveyor independently of any automatic controls. A motor 8, Figure 1, controls the speed of the variable gear 9 driving the conveyor 10 through gear box 11. A motor 12 controls the speed of the variable gear 13 driving the cutting machine 5 through gear box 14. A pair of control buttons 15, 16, operate the motor 12 independently. An electric motor 17 controls the speed gear 18 driving the oven through gear box 19. A pair of control buttons 20, 21, operate the switches of motor 17 independently to the rest of the plant, and control buttons 22 operate the switches of motors 8, 12, and 17 simultaneously. Indicator fingers 23, 24, show when the conveyor unit and the oven unit are in synchronism as they are geared to revolve at the same speed if the oven and conveyor speeds are alike. Indicator fingers 25 revolving together on coaxial spindles show whether the oven and machine are in synchronism.

Taking one control gear by way of example, drum 26 (shown in Figures 2, 4, and 5) is keyed or otherwise fastened to shaft 27, which shaft is geared to the cutting machine. Drum 28 driven by shaft 29 is controlled by gearing from the oven. The gearing is such that if the oven and cutting machine are running at equal speeds the drums 26 and 28 will be revolving at the same speed.

Drum 28 acts as a cam, the hollow 30 of which gives the periodical movement to contact levers 31 and 32, at each revolution. Roller 33 drops into the depression 30, and spring 34 assists the roller 33 to follow the contour of the drum 28. A shoe 35 resiliently mounted on lever 31 periodically contacts with the surface of drum 26 at each revolution.

A third lever 36 is not provided with a roller and does not receive any movement. This lever acts as brush gear and causes the contact segments 37 on the surface of the drum 26 to be connected with the electrical supply. The contact shoe 38 on lever 36 is all the time bearing on contact band 37. The surface of the drum 26 is made mainly of non-conducting material, but the copper band 37 and segments 39 and 40 are let into the surface of the drum, so that it is possible to get electrical connection between levers 36 and 32 or 36 and 31 through the copper bands 40, 39, 37.

In the working of the apparatus the Figure 2 shows the position of the contact shoes 35 in relation to the contact segment on the drum when the oven and machine are running in synchronism. Figure 4 shows the position of the shoes 35 in relation to the contact segments, if the machine speed should have exceeded the oven speed. In this case, the shoe on contact arm 31 makes electrical connection with the segment 40 on the drum causing current to flow to the motor 12 in a direction that will slow down the variable gear 13 in the cutting machine 5. Figures 5 and 7 show the position of the shoe 35 in relation to the contact on the drum when the machine is running slower than the oven. In this case, contact lever 32 is making electrical connection with arm 36, and the motor 12 is caused to revolve so as to increase the speed of the variable gear 13.

Figure 8 shows the mechanical arrangement connecting the speed control motor to the variable gear. A motor 41 is geared to adjusting screws 42 by means of reduction gear 43, and chain 44, the direction of rotation depending upon the motor. If hand control only is required, then the withdrawing of hand wheel 45 disconnects gear 46 from gear 47, and any rotation of the motor is not transmitted to the screw 42. The returning of the hand wheel and the gearing together of gears 46 and 47 will allow the motor to control the speed of the variable gear.

I declare that what I claim is:—

In a synchronizing device for controlling the speeds of independently driven shafts, one of said shafts being driven through a variable speed transmission, means for synchronizing the speeds of said shafts when one of said shafts acquires a different angular velocity than the other, the said means comprising a rotating cam fixed for rotation with respect to one of said shafts, and a rotating electrical contact member fixed for rotation with respect to the other of said shafts, a lever system mounted on a fixed pivot and engaged with said cam to be rocked thereby and carrying a second contact member adapted to cooperate with said rotating contact member, and electrically actuated means for varying the speed ratio of said transmission and including conductors operatively connected to said contact members whereby a departure of said shafts from synchronism causes said lever system to bring said contact members together to close an actuating circuit through said conductors and means for varying the speed of driving said one shaft and thereby restoring synchronism.

In witness whereof I have hereunto signed my name this 28th day of April, 1930.

JOSEPH FRANCIS NAYLOR.